United States Patent [19]
Huddleston

[11] Patent Number: 5,647,810
[45] Date of Patent: Jul. 15, 1997

[54] DRIVE ARM-ENGAGING ROLLER FOR CENTRIFUGAL CLUTCH

[75] Inventor: H. Mike Huddleston, Richmond, Ind.

[73] Assignee: Hoffco, Inc., Richmond, Ind.

[21] Appl. No.: 525,381

[22] Filed: Sep. 8, 1995

[51] Int. Cl.$^6$ ................................................. F16H 61/00
[52] U.S. Cl. ...................... 474/14; 192/105 CD; 384/126
[58] Field of Search ....................... 474/8, 11, 13, 474/14; 192/105 C, 105 CD; 384/126, 127

[56] References Cited

U.S. PATENT DOCUMENTS

| | | | |
|---|---|---|---|
| Re. 27,858 | 1/1974 | Laughlin | 74/230.17 E |
| 3,107,949 | 10/1963 | Moskovitz | 384/127 |
| 3,733,918 | 5/1973 | Domaas | 474/14 |
| 3,759,111 | 9/1973 | Hoff | 74/230.17 E |
| 3,777,584 | 12/1973 | Domaas | 74/230.17 E |
| 3,861,229 | 1/1975 | Domaas | 74/230.17 E |
| 3,961,539 | 6/1976 | Tremblay et al. | 74/230.17 E |
| 4,027,544 | 6/1977 | Kobayashi | 474/14 |
| 4,464,144 | 8/1984 | Kobayashi | 474/13 X |
| 4,483,686 | 11/1984 | Kobayashi et al. | 474/11 |
| 4,881,828 | 11/1989 | Kato | 74/569 X |
| 4,938,610 | 7/1990 | Kato | 74/569 X |
| 5,154,673 | 10/1992 | Fukunaga et al. | 474/13 |
| 5,209,703 | 5/1993 | Mastine et al. | 474/14 |
| 5,326,330 | 7/1994 | Bostelmann | 474/13 |
| 5,460,575 | 10/1995 | Berto | 474/13 X |

FOREIGN PATENT DOCUMENTS

| | | |
|---|---|---|
| 985931 | 3/1976 | Canada. |
| 614387 | 12/1926 | France. |
| 58-102852 | 6/1983 | Japan. |
| 60-201162 | 10/1985 | Japan. |

OTHER PUBLICATIONS

S.A.E. Journal (Transactions), vol. 41, No. 4, Oct., 1937, pp. 480–481.

*Primary Examiner*—Roger J. Schoeppel
*Attorney, Agent, or Firm*—Barnes & Thornburg

[57] ABSTRACT

A centrifugal actuator is provided for a centrifugal clutch having an axially fixed base and an axially movable pulley flange. The actuator includes a drive arm having a camming surface and a bottom that is pivotably attached to the movable pulley flange, a mounting pin coupled to the fixed base, and an improved roller that rotates about the mounting pin. The roller includes an outer sleeve and an inner sleeve coupled to the outer sleeve. The outer sleeve is made of metal and has an outer surface that frictionally engages the camming surface of the drive arm. The inner sleeve is made of a plastics material and has an inner load-bearing surface that engages the mounting pin. The roller rotates about the mounting pin as the drive arm swings outwardly and inwardly.

46 Claims, 4 Drawing Sheets

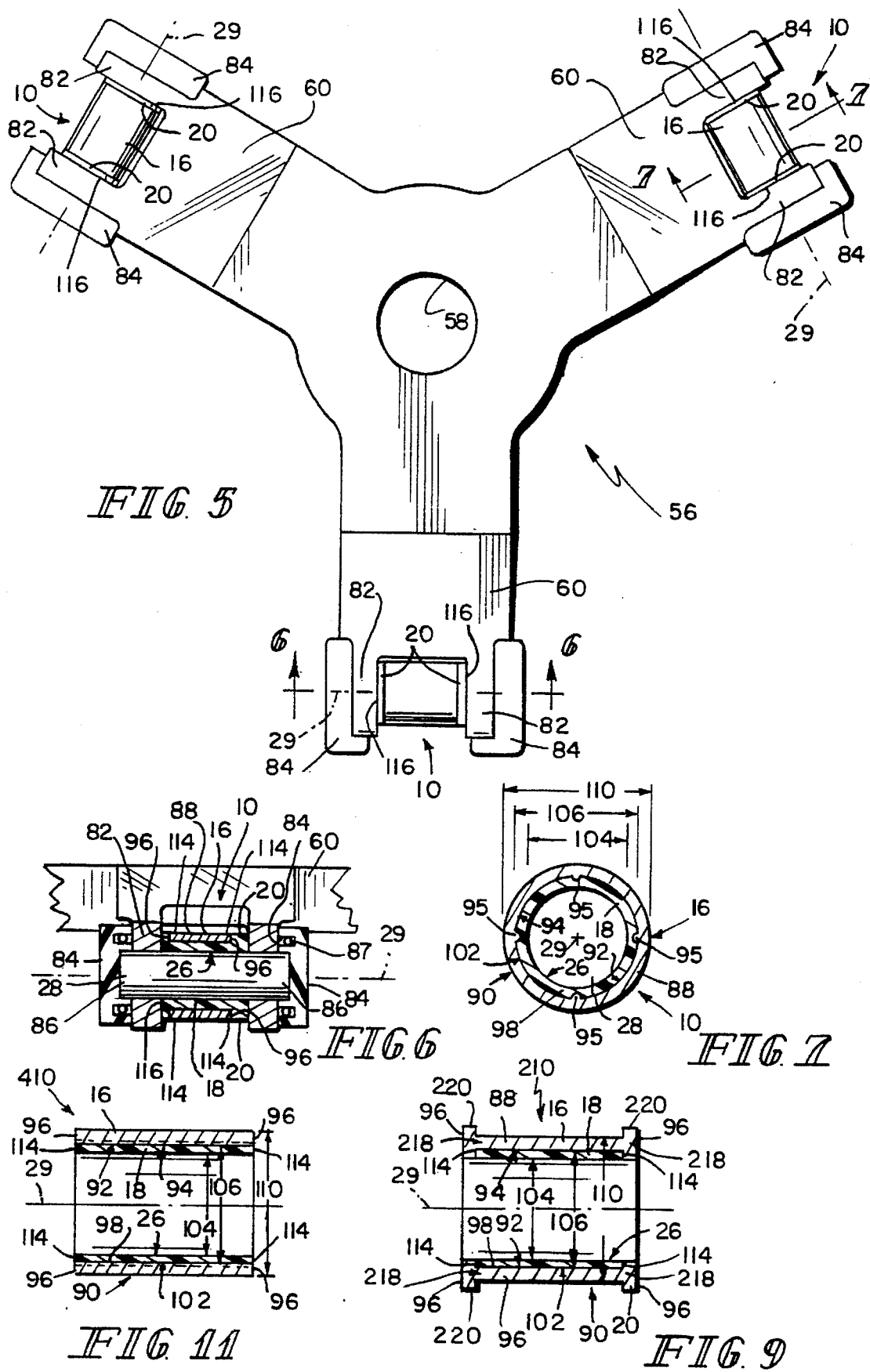

DRIVE ARM-ENGAGING ROLLER FOR CENTRIFUGAL CLUTCH

BACKGROUND AND SUMMARY OF THE INVENTION

The present invention relates to centrifugal clutch assemblies for use in recreational vehicles, and particularly to a roller for engaging a pivotable drive arm in a centrifugal clutch assembly. More particularly, the present invention relates to rollers appended to a fixed base of a centrifugal clutch assembly having drive arms that pivot under the influence of centrifugal force to act against the rollers to actuate a variable-speed pulley included in the centrifugal clutch assembly.

Recreational vehicles such as golf carts, snowmobiles, and go-karts are typically provided with a centrifugal clutch assembly that includes a variable-speed pulley. The variable-speed pulley is connected to an engine shaft and typically includes a fixed pulley flange mounted on the engine shaft and a movable pulley flange that is able to slide back and forth along the longitudinal axis of the engine shaft. Typically, a drive belt lies in a V-shaped groove defined between the fixed and movable pulley flanges. When the pulley flanges are closer together, the drive belt is turned at a higher speed. When the flanges are further apart, the drive belt is turned at a lower speed. See, for example, U.S. Pat. No. 3,759,111 to Hoff for a description of a centrifugal clutch with such a variable-speed pulley.

A variable-speed pulley of the type disclosed in the Hoff '111 patent typically is actuated to increase the speed of a drive belt coupled to the variable-speed pulley by a plurality of centrifugal drive arms mounted for pivotable movement on a circular movable pulley flange of the variable-speed pulley and arranged to lie in spaced-apart relation around the circumference of the circular movable pulley flange. Typically, such pivotable centrifugal drive arms swing outwardly away from the longitudinal axis of an engine drive shaft during rotation of the variable-speed pulley about the longitudinal axis of the engine shaft on which the variable-speed pulley is mounted. The drive arms act against rollers mounted for rotation on a base that is fixed to the engine shaft. The action of the drive arms against the rollers causes the movable pulley flange to move axially along the longitudinal axis of the engine shaft toward the fixed pulley flange.

A tip end of each centrifugal drive arm is configured to engage and "push off" against one of the rollers mounted on the fixed base during operation of the centrifugal clutch. This push-off action is sufficient to urge the movable pulley flange in a direction toward the fixed pulley flange while the drive belt lies in the V-shaped groove defined between the movable and fixed pulley flanges so as to narrow the width of the V-shaped groove and increase the speed of the drive belt. Thus, pivoting movement of the centrifugal drive arm against the rollers functions to "actuate" the centrifugal clutch so as to change the speed of a drive belt engaging the variable-speed pulley in the centrifugal clutch.

Typically, roller assemblies are mounted to a fixed base in spaced-apart relation and are arranged to oppose the pivotable drive arms. For example, U.S. Pat. Nos. 5,326,330 to Bostelmann; 4,483,686 to Kobayashi et al.; 3,961,539 to Tremblay et al.; 3,861,229 and U.S. Pat. No. 3,777,584 to Domaas; U.S. Pat. No. 27,858 to Laughlin; as well as Canadian Patent 985,931 and Japanese Patent No. 58-102, 852 to Kobayashi all disclose clutches including rollers for use with pivotable drive arms. Rollers of this kind are well-known. For example, U.S. Pat. Nos. 5,154,673 to Fukunaga et al.; 4,938,610 and 4,881,828 to Kato; as well as Japanese Patent No. 60-201,162 to Shimizu, French Patent No. 614,387 to Ballot, and a journal article in S. A. E. Journal (Transactions), vol. 41, no. 4, pp 480–81 all disclose rollers, some of which are for use in centrifugal clutches.

One type of design for a roller assembly is disclosed by Japanese Patent No. 60-201,162 to Shimizu. This type of roller assembly includes a ring-shaped member connected to the outer periphery of a bearing by press fitting two steel bearings to the inner peripheral side of the ring-shaped member. The bearings include an interior surface that is arranged to engage a pin extending along the longitudinal axis of the roller assembly.

There is inherent variability associated with the magnitude of the inner diameters of any group of ring-shaped members as the result of factors related to the production of ring-shaped members, and there is inherent variability associated with the magnitude of the outer diameters of any group of bearings as the result of factors related to the production of bearings. The variability of the inner diameters of the ring-shaped members and the variability of the outer diameters of the bearings can cause the fit of some bearings in some ring-shaped members to be too tight and other bearings in other ring-shaped members to be too loose. Both of these unfavorable tolerance combinations, typically referred to as "unfavorable tolerance stack-ups", can result in scrap or premature failure of the roller during use.

What is needed is a roller assembly for use in opposing a pivotable drive arm in a variable-speed centrifugal clutch, the roller assembly being easy to assemble, inexpensive to produce, and including a minimum number of parts. Vehicle manufacturers would appreciate a roller that is configured to minimize unfavorable tolerance stack-up problems of the type that can affect roller sleeves and bearings in conventional rollers, thereby minimizing scrap and wear of the roller and its companion centrifugal drive arm.

According to the present invention, a centrifugal actuator is provided for a centrifugal clutch having an axially fixed base and an axially movable pulley flange. The actuator acts between the fixed base and the movable pulley flange. The actuator includes a drive arm having a camming surface and a bottom that is pivotably attached to the movable pulley flange, a mounting pin coupled to the fixed base, and an improved roller that rotates about the mounting pin and that has an outer surface that engages the drive arm.

The roller includes a cylindrical outer sleeve having a side wall formed to include an outer drive arm-engaging surface engaging the camming surface of the drive arm. The side wall of the outer sleeve defines an interior region. A cylindrical inner sleeve is received by the interior region. The cylindrical inner sleeve includes a side wall having an outer surface coupled to the cylindrical outer sleeve and an inner load-bearing surface engaging the mounting pin.

In preferred embodiments, the roller in accordance with the present invention is mounted to a base that is fixed to an engine drive shaft. The centrifugal clutch includes three circumferentially spaced-apart actuators and each actuator includes a pivotable drive arm having a camming surface. The camming surface of each drive arm engages one of the rollers.

The drive arms are mounted on a movable pulley flange that can slide axially along the engine drive shaft relative to a fixed pulley flange and that can rotate about the engine drive shaft. Centrifugal force created by rotation of the movable pulley flange at a speed in excess of a certain speed causes each drive arm to swing radially outwardly from a static inward position to an outward position. As the rotational speed of the movable pulley flange increases, the drive arms push off against the rollers and swing outwardly causing the movable pulley flange to slide along the engine drive shaft from a lowest-speed position far from fixed pulley flange to a highest-speed position near the fixed pulley flange.

Each roller in accordance with the present invention includes an outer sleeve and an inner sleeve coupled to the outer sleeve. The inner sleeve of the roller includes an interior load-bearing surface defining a cylindrical interior region of the roller. Each outer sleeve includes a drive-arm engaging surface that frictionally engages the camming surface of the drive arm so that the roller rotates as the drive arm swings outwardly and inwardly. The load-bearing surface of each roller engages a mounting pin connected to the base fixed to the engine drive shaft and slides around the mounting pin as the roller rotates relative to the mounting pin.

Also in preferred embodiments, the outer sleeve is a cylindrical steel sleeve and the inner sleeve is made from a plastics material. The steel sleeve provides a wear-resistant drive arm-engaging surface that also distributes the load resulting from engagement between the drive arm-engaging surface and the drive arm across the length of the roller. The drive arm-engaging surface of the outer steel sleeve cooperates with the tip of the drive arm to provide enough friction therebetween to ensure that the roller rotates in response to pivoting movement of the drive arm.

The inner sleeve of each roller is preferably injection molded directly onto its companion outer sleeve. Injection molding the inner sleeve onto the outer sleeve involves fewer manufacturing steps than producing a separate inner sleeve and subsequently inserting the separate inner sleeve into the interior region of the outer sleeve.

In addition, a member in the injection mold establishes the size and shape of the interior bearing surface of the inner sleeve that engages the pin, so that the bearing surface in each roller is of a consistent size and shape regardless of the size or shape of the interior surface of the cylindrical outer sleeve. As a result, the variability of the inner diameters of the inner sleeves among a group of rollers is minimized when the inner sleeves are formed from an injection molded plastics material.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 5 is a plan view of a drive spider defining the fixed base of FIGS. 1 and 2, showing three uniformly spaced-apart spider arms of the drive spider and each spider arm carrying a rotatably mounted roller in accordance with the present invention;

FIG. 6 is a sectional view taken along line 6—6 of FIG. 5 showing the roller mounted on a centrally located mounting pin that is positioned to lie between two roller mount arms of the drive spider and held into place by two buttons;

FIG. 7 is a sectional view taken along line 7—7 of FIG. 5 showing the centrally located mounting pin, inner and outer sleeves of the roller, and inwardly directed splines appended to the outer sleeve;

FIG. 9 is a view similar to FIG. 6 of a second embodiment of a roller in accordance with the present invention showing flanges appended to the ends of the outer sleeve extending radially inwardly to engage the ends of the inner sleeve and extending radially outwardly to form ridges that define a drive arm-engaging surface therebetween;

FIG. 11 is a view similar to FIG. 10 of a fourth embodiment of a roller in accordance with the present invention showing two concentric annular sleeves, each sleeve including a left end and a right end, the left end of the outer sleeve terminating adjacent to the left end of the inner sleeve and the right end of the outer sleeve terminating adjacent to the right end of the inner sleeve.

DETAILED DESCRIPTION OF THE DRAWINGS

Figure 1:
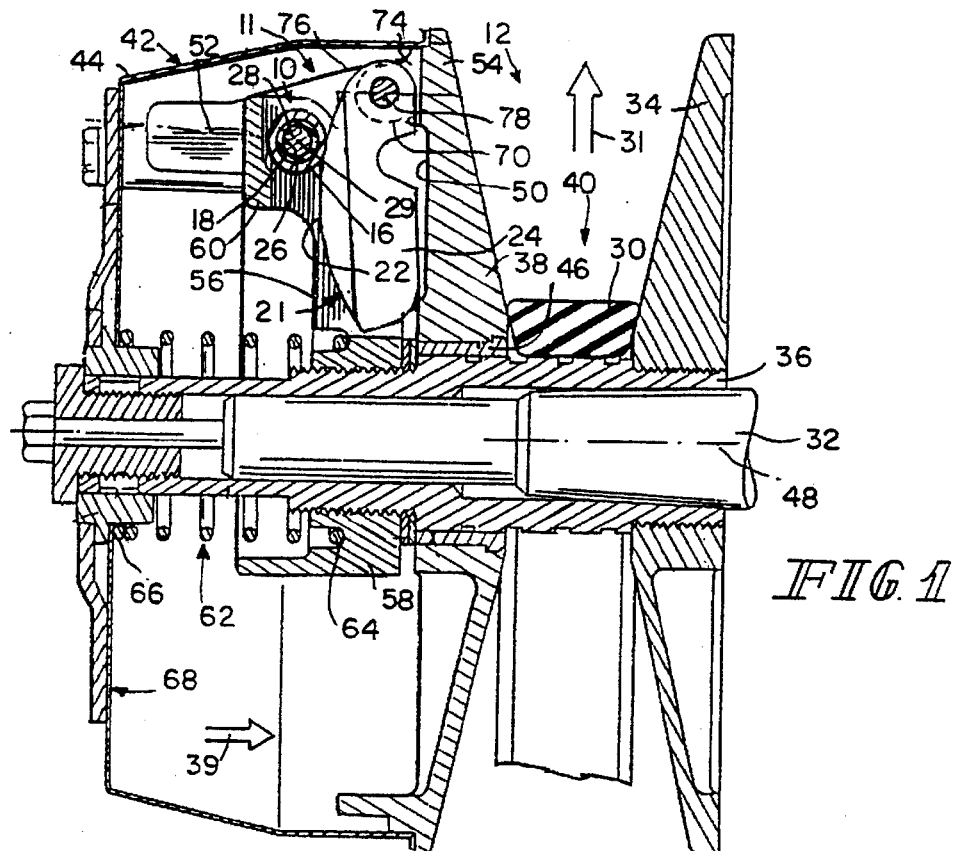
FIG. 1 is a sectional view of a centrifugal clutch having a variable-speed pulley mounted on an engine drive shaft and a roller in accordance with the present invention mounted on a fixed base coupled to the engine drive shaft showing a left-side movable pulley flange of the variable-speed pulley in its normal open "lowest-speed" position away from a right-side fixed pulley flange and a curved camming surface on a pivotable centrifugal drive arm in engagement with the roller.
Figure 2:
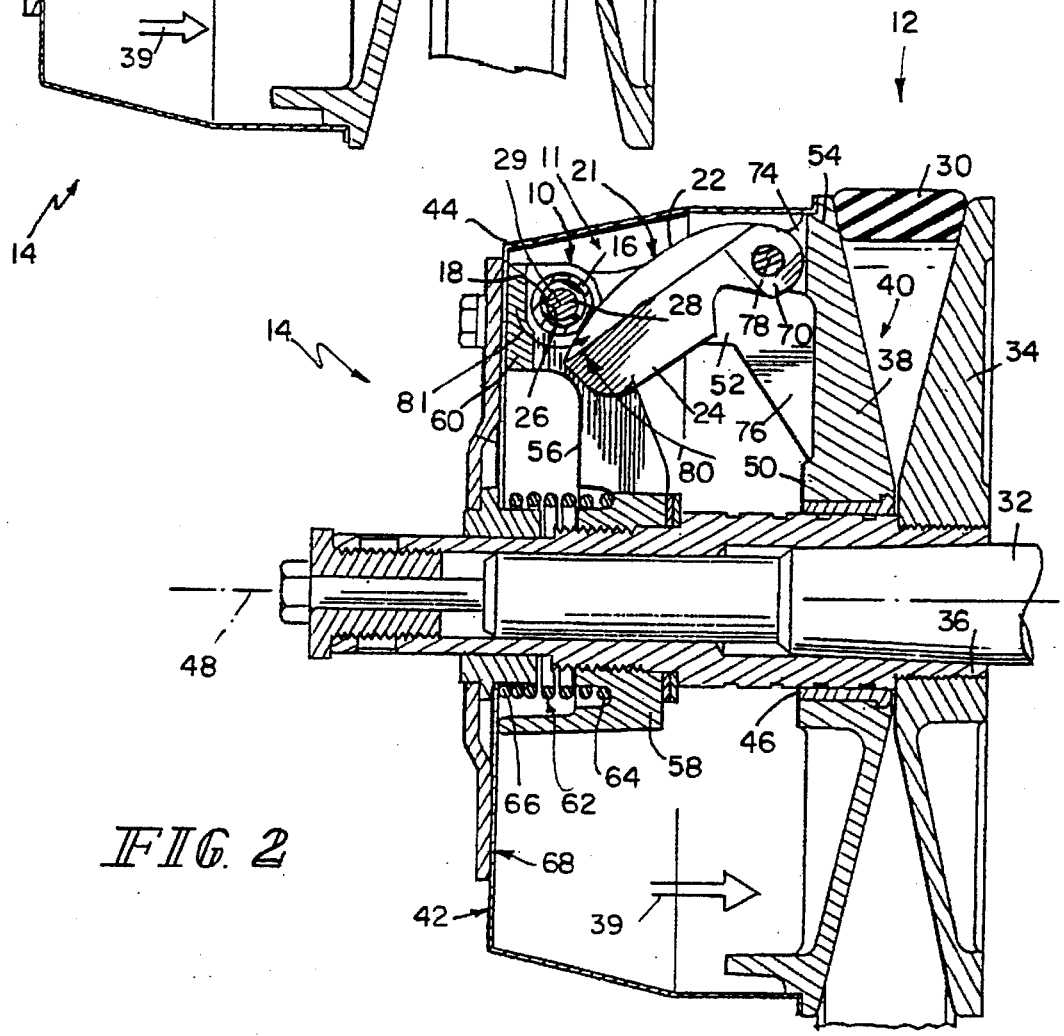
FIG. 2 is a view similar to FIG. 1 showing the movable pulley flange after it has been forced over toward the right-side fixed pulley flange to its cam-actuated closed "highest-speed" position by clockwise pivoting movement of the centrifugal drive arm reacting against the roller mounted on the fixed base included in the centrifugal clutch and coupled to the engine drive shaft.
Figure 3:
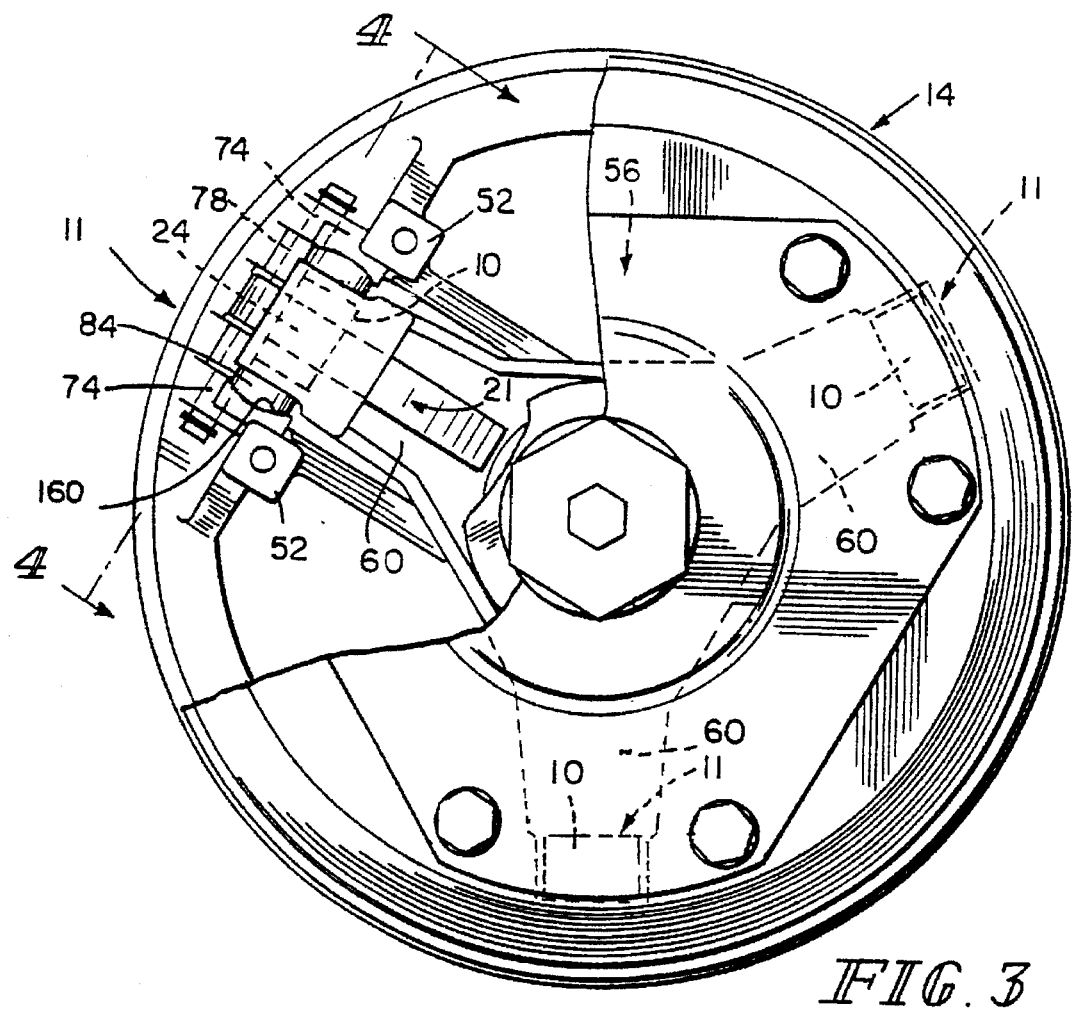
FIG. 3 is a front elevation view of the centrifugal clutch of FIG. 1 with portions broken away showing the fixed base and a centrifugal actuator including a roller in accordance with the present invention mounted on the fixed base.

A centrifugal actuator 11 for actuating a variable-speed pulley 12 included in a centrifugal clutch 14 is illustrated in FIGS. 1-4. Illustratively, centrifugal clutch 14 includes three centrifugal actuators 11 uniformly spaced-apart about the circumference of centrifugal clutch 14, e.g., 120° apart from one another as shown in FIGS. 3 and 5. These centrifugal actuators 11 function in a manner explained below to adjust the configuration of variable-speed pulley 12 automatically so as to vary the speed of a drive belt 30 engaging variable-speed pulley 12.

Figure 10:
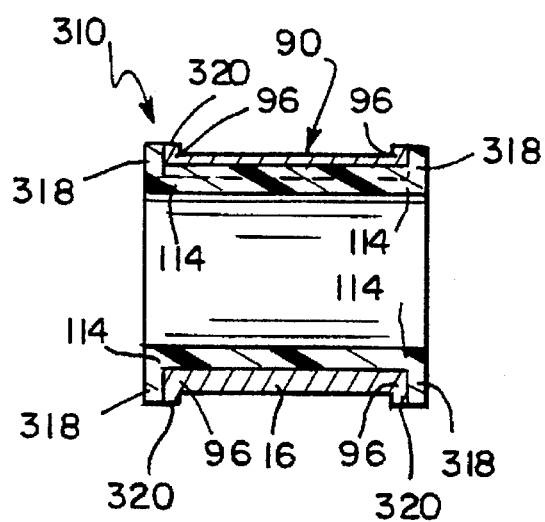
FIG. 10 is a view similar to FIG. 9 of a third embodiment of a roller in accordance with the present invention showing flanges appended to the ends of the inner sleeve extending radially outwardly to engage the ends of the outer sleeve and ridges appended to the ends of the outer sleeve extending radially outwardly to define a drive arm-engaging surface therebetween.

Each centrifugal actuator 11 includes an improved roller 10 in accordance with the present invention and a pivotable drive arm 24 engaging roller 10. Roller 10 is designed to resist wear to enhance the operating life and quiet operation of centrifugal clutch 14. A first embodiment of roller 10 shown in FIGS. 6, 7, and 8 includes a cylindrical outer sleeve 16, a cylindrical inner sleeve 18, and annular flanges 20 appended integrally to ends 114 of cylindrical inner sleeve 18 and flared outwardly to trap cylindrical outer sleeve 16 therebetween. Illustratively, cylindrical inner sleeve 18 and its flanges 20 are formed by injection molding a plastics material on to cylindrical outer sleeve 16. Other embodiments of an improved roller in accordance with the present invention are shown in FIGS. 9–11.

Cylindrical outer sleeve 16 engages a camming surface 21 of a tip 22 of a companion centrifugal drive arm 24 as shown in FIGS. 1 and 2. Cylindrical outer sleeve 16 includes an exterior drive arm-engaging surface 90 that frictionally engages camming surface 21 and that cooperates with camming surface 21 to cause roller 10 to rotate in direction 81 in response to pivoting movement of centrifugal drive arm 24 in direction 80 as shown in FIG. 2. Satisfactory results can be achieved when cylindrical outer sleeve 16 is formed from steel. Cylindrical outer sleeve 16 further includes an interior surface 92 that defines an interior region 94.

Figure 8:
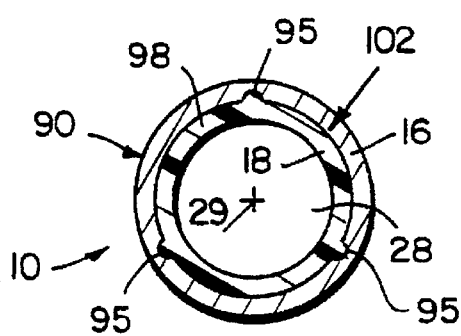
FIG. 8 is a view similar to FIG. 7 showing the centrally located mounting pin, inner and outer sleeves of the roller, and outwardly directed splines appended to the inner sleeve.

Cylindrical inner sleeve 18 is received in interior region 94 and is coupled to interior surface 92 as shown in FIGS. 6–8. Cylindrical inner sleeve 18 forms an inner bearing surface 26 in engagement with a fixed-position mounting pin 28 as shown in FIGS. 1, 2, and 6–8. Satisfactory results can be achieved when cylindrical inner sleeve 18 is formed from a material having good load-bearing, lubricating, creep-resistance, compression-resistance, heat-resistance, and moisture-absorption characteristics. Preferably, cylindrical inner sleeve 18 is made from an "engineering-type plastic" such as Vespel™ made by DuPont, Torlon™ made by Amoco, and Peak™ made by LMP.

Centrifugal clutch 14, illustrated in FIGS. 1 and 2, includes a variable-speed pulley 12 for turning a drive belt 30 at a selected speed in response to rotation of an engine drive shaft 32 on which centrifugal clutch 14 is mounted. The variable-speed pulley 12 includes a fixed pulley flange 34 mounted to an elongated hub 36 coupled to engine drive shaft 32 as shown in FIGS. 1 and 2. Variable-speed pulley 12 further includes a movable pulley flange 38 which cooperates with fixed pulley flange 34 to define a V-shaped groove 40 receiving drive belt 30 therein. A movable assembly 42 including a movable shell 44 and movable pulley flange 38 is mounted to a sliding bearing 46 on elongated hub 36.

Movable pulley flange 38 moves back and forth along a longitudinal central axis 48 of engine drive shaft 32 in response to an actuation force applied by centrifugal drive arm 24 (in the manner described below) to change the effective width of the drive belt-receiving V-shaped groove 40 during operation of centrifugal clutch 14 and thus vary the turning speed of drive belt 30 within a range of speeds. The longitudinal position of movable pulley flange 38 along longitudinal axis 48 relative to fixed pulley flange 34 is controlled by the three centrifugal actuators 11 and a single compression spring 62 mounted in centrifugal clutch 14 in the manner described below.

Figure 4:
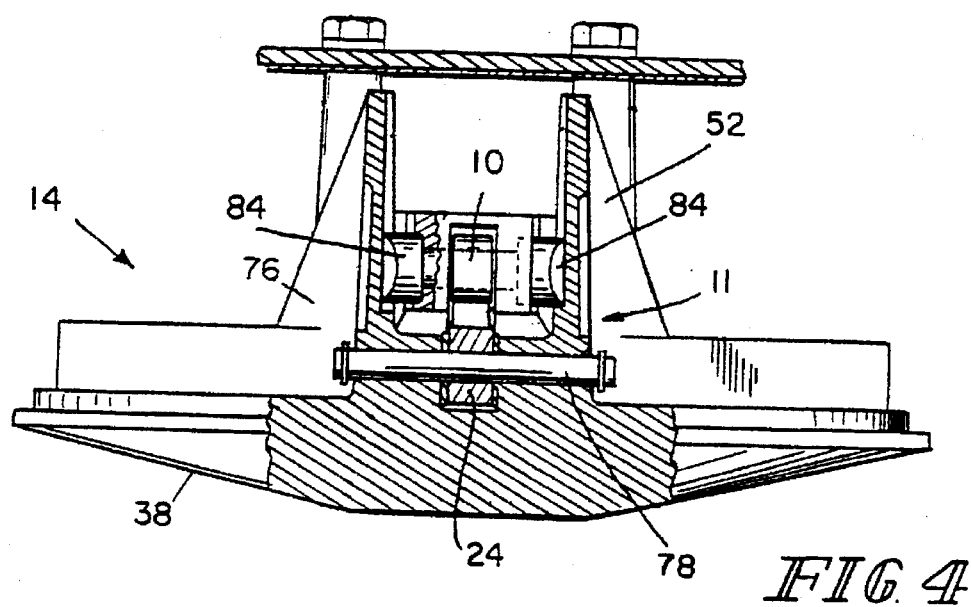
FIG. 4 is a view taken along line 4—4 of FIG. 3 showing the centrifugal actuator including the drive arm pivotably mounted between two bosses on the movable pulley flange and the roller mounted on the fixed base and engaging the drive arm.

Movable pulley flange 38 includes a clutch housing 50 arranged to extend away from fixed pulley flange 34 as shown in FIG. 2. Clutch housing 50 has a plurality of pairs of axially extending drive posts 52 adjacent its periphery 54 through which it is rotatively driven by a fixed base 56 often referred to as a "drive spider" because of its spider-like appearance as shown in FIGS. 3 and 5. Drive spider 56 includes a central hub 58 that is fixed on elongated hub 36 and a plurality of radially outwardly extending spider arms 60 as shown in FIGS. 1–3 and 5. Each spider arm 60 is positioned to lie in a space provided between one of three pairs of posts 52 in torque-transmitting relation therewith as shown in FIGS. 3 and 4. Thus, drive spider 56 is "keyed" to rotate with both engine drive shaft 32 and fixed pulley flange 34 and is also keyed to rotate clutch housing 50 of movable pulley flange 38 about longitudinal axis 48 in response to rotation of engine drive shaft 32 and fixed pulley flange 34.

Compression spring 62 is positioned inside movable shell 44 as shown in FIGS. 1 and 2. Compression spring 62 assists in controlling the lateral position of movable pulley flange 38 relative to fixed pulley flange 34 during operation of centrifugal clutch 14. Compression spring 62 has a first end 64 that engages central hub 58 of drive spider 56 and a second end 66 that engages an inner wall 68 of movable shell 44. Compression spring 62 normally acts against the fixed central hub 58 to urge movable shell 44 along longitudinal axis 48 in a direction away from fixed pulley flange 34 as shown in FIG. 1. As a result, the width of V-shaped groove 40 between fixed pulley flange 34 and movable pulley flange 38 is maximized so that drive belt 30 can move to a "lowest-speed" position shown in FIG. 1.

Movable pulley flange 38 is thrust axially toward fixed pulley flange 34 during operation of centrifugal clutch 14 by centrifugal weights lying in clutch housing 50 and acting between movable pulley flange 38 and spider arms 60. The preferred centrifugal weights are centrifugal drive arms 24 having one end mounted for pivotable movement on movable pulley flange 38 and an edge engaging and reacting against rollers 10 mounted on drive spider 56. One such roller 10 is mounted on each spider arm 60 as shown in FIGS. 3 and 5 and each roller 10 is engaged by a camming surface 21 of tip 22 of a companion centrifugal drive arm 24. Reference is hereby made to U.S. Pat. No. 3,759,111 to Hoff and U.S. patent application Ser. No. 08/323,376 to Huddleston et al. filed on Oct. 14, 1994 which are incorporated by reference herein for descriptions of illustrative centrifugal clutch assemblies in which rollers 10 in accordance with the present invention may be installed.

Each of the three centrifugal actuators 11 include a centrifugal drive arm 24 having a bottom 70 positioned to lie between two laterally spaced-apart pivot pin support mounts or bosses 74 as shown in FIGS. 3 and 4. Each drive post in each pair of drive posts 52 includes a boss 74 appended to a base 76 of each drive post 52. Each centrifugal drive arm 24 is mounted for pivotable movement on a pivot pin 78. Centrifugal drive arms 24 normally swing outwardly along an arc 80 as shown, for example, in FIG. 1, under the influence of centrifugal force generated during rotation of centrifugal clutch 14 about longitudinal axis 48 against a companion roller 10 appended to drive spider 56. Rotation of engine drive shaft 32 causes rotation of centrifugal clutch 14 about longitudinal axis 48.

During operation of centrifugal clutch 14, variable-speed pulley 12 is normally held in a wide-groove, lowest-speed condition as shown in FIG. 1 in which drive belt 30 is free between the pulley flanges and in de-clutched condition. As the rotational speed of engine drive shaft 32 is increased, pivotable centrifugal drive arms 24 swing outwardly along arc 80 to engage and "push off" against rollers 10 in spider arms 60, thereby thrusting movable pulley flange 38 to the right in direction 39, away from fixed spider arms 60 and toward the closed "highest-speed" position shown in FIG. 2. Initial movement of movable pulley flange 38 in direction 39 carries pulley flanges 34, 38 into engagement with drive belt 30 positioned therebetween. As rotational speed of engine drive shaft 32 increases, V-shaped groove 40 defined between pulley flanges 34, 38 is progressively narrowed. As the lateral width of V-shaped groove 40 narrows, drive belt 30 is moved in direction 31 outward to its maximum highest-speed position shown in FIG. 2. It is assumed herein that drive belt 30 is connected to a driven pulley (not shown) that is located in spaced-apart relation to variable-speed pulley 12.

At all speeds, and especially at high speeds which generate high centrifugal forces on post 52 and other parts of variable-speed pulley 12, all parts of the structure are strongly tied together to resist failure under centrifugal force. When high speed has carried movable pulley flange 38 to the fully-closed position shown in FIG. 2, any additional centrifugal force produced by still higher speeds of rotating engine drive shaft 32 will of course produce additional thrust force. That additional thrust force will be contained and transmitted directly to posts 52 to produce stress in tension and will not be transmitted to other parts to produce bending stress.

Each mounting pin 28 holding a rotatable roller 10 is positioned to lie between two roller mount arms 82 of drive spider 56 as shown in FIGS. 3–5. Two buttons 84 are formed to include inwardly-facing annular channels 85 as shown in FIG. 6. Buttons 84 engage ends 86 of mounting pin 28 to secure mounting pin 28 to spider arm 60 as shown in FIGS. 5 and 6. A resilient ring 87 is received by each channel 85 of each button 84. Rings 87 cooperate with buttons 84 to hold buttons 84 on to mounting pin 28. Preferably, buttons 84 are made from an engineering-type plastic.

Outer sleeve 16 of roller 10 is generally cylindrical in shape. Cylindrical outer sleeve 16 includes a wall 88 having a drive arm-engaging surface 90, an interior surface 92 arranged to define an interior region 94, and two ends 96 as shown in FIGS. 6–8. Cylindrical outer sleeve 16 is preferably made of a heat-treated steel such as C1215 steel. It is within the scope of the invention as presently perceived, however, to make cylindrical outer sleeve 16 from any suitable material that will distribute the load created by engagement between drive arm-engaging surface 90 and tip 22 of centrifugal drive arm 24 throughout the interior surface 92 of the outer sleeve 16, that will retain its shape during use in centrifugal clutch 14, and that will provide enough friction between drive arm-engaging surface 90 and tip 22 of centrifugal drive arm 24 to cause roller 10 to rotate about the axis of rotation 29 as centrifugal drive arm 24 pivots about pivot pin 78.

Cylindrical outer sleeve 16 may be formed to include one or more splines 95 appended to interior surface 92 and arranged to extend inwardly toward axis of rotation 29 of roller 10 as shown, for example, in FIG. 7 in which four splines 95 are spaced-apart around interior surface 92. Alternatively, cylindrical inner sleeve 18 may be formed to include one or more splines 95 appended to an exterior surface 102 of inner sleeve 18 and arranged to extend outwardly away from axis of rotation 29 of roller 10 as shown, for example, in FIG. 8 in which three splines are spaced-apart around exterior surface 102.

Splines 95 interlock cylindrical sleeves 16, 18 to ensure that cylindrical sleeves 16, 18 are rotatably fixed or keyed to one another so that cylindrical inner sleeve 18 rotates about axis of rotation 29 in response to rotation of cylindrical outer sleeve 16 about axis of rotation 29. If cylindrical outer sleeve 16 rotates independently of cylindrical inner sleeve 18, cylindrical inner sleeve 18 can wear and deform until roller 10 seizes. Once roller 10 is no longer rotatable relative to mounting pin 28, centrifugal cam lever 24 will wear rapidly resulting in the failure of centrifugal actuator 11.

Cylindrical inner sleeve 18 of roller 10 is also cylindrical in shape. Cylindrical inner sleeve 18 includes a wall 98 having bearing surface 26 and exterior surface 102. Cylindrical inner sleeve 18 engages mounting pin 28 and rotates relative to mounting pin 28 during rotation of roller 10. Cylindrical inner sleeve 18 is illustratively provided with radially outwardly flared annular flanges 20 or any other feature such as a rim, brow, edge, lip, or any other augmentation that is illustratively appended to ends 114 of cylindrical inner sleeve 18 and arranged to engage opposite ends 96 of cylindrical outer sleeve 16 as shown in FIG. 6. Flanges 20 ensure that the first and second cylindrical sleeves 16, 18 are axially fixed in a predetermined position relative to one another, thereby preventing axial movement of cylindrical inner sleeve 16 relative to cylindrical inner sleeve 18. If outer sleeve 16 moves axially relative to inner sleeve 18, outer sleeve 16 might eventually engage drive spider 56. Once outer sleeve 16 engages drive spider, roller 10 will no longer rotate relative to drive spider 56 causing centrifugal cam lever 24 to wear rapidly and resulting in the failure of centrifugal actuator 11.

Cylindrical inner sleeve 18 can be formed on cylindrical outer sleeve 16 using an injection-molding process. In this process, cylindrical outer sleeve 16 is placed into a mold (not shown) including a member (not shown) having a predetermined outer diameter. The member is placed into interior region 94 of cylindrical outer sleeve 16 of roller 10 and plastics material is injected into the mold. Cylindrical inner sleeve 18 is preferably made of an engineering-type plastic such as Vespel™ made by DuPont, Torlon™ made by Amoco, and Peak™ made by LMP, although satisfactory results can be achieved when cylindrical inner sleeve 18 is formed from any material having good load-bearing, lubricating, creep-resistance, compression-resistance, heat-resistance, and moisture-absorption characteristics.

The mold and cylindrical outer sleeve 16 are arranged so that the plastics material adheres to interior surface 92 of wall 88 as well as to ends 96 of cylindrical outer sleeve 16. The mold is configured so that drive arm-engaging surface 90 is free of plastics material after the injection molding process is completed. Significantly, inner diameters 104 of several cylindrical inner sleeves 18 can be precisely and repeatedly produced when cylindrical inner sleeves 18 are formed around a member in this manner regardless of the variability of inner diameters 106 among individual cylindrical outer sleeves 16.

Preferred embodiments of roller 10 include a cylindrical outer sleeve 16 that is made of heat-treated steel and a cylindrical inner sleeve 18 that is made of the plastics material that forms both inner diameter 104 of bearing surface 26 and flanges 20 on each end of cylindrical inner sleeve 18. Each flange 20 includes a thrust surface 116 as shown in FIGS. 5 and 6. Preferably, cylindrical outer sleeve 16 and cylindrical inner sleeve 18 are molded together as one. Steel cylindrical outer sleeve 16 ensures that enough friction is present between the camming surface 21 on tip 22 of centrifugal drive arm 24 and drive arm-engaging surface 90 of steel cylindrical outer sleeve 16 to rotate roller 10. The steel cylindrical outer sleeve 16 also helps to transmit the load created by the engagement of centrifugal drive arm 24 and roller 10 throughout plastic bearing area 26.

Steel cylindrical outer sleeve 16 is provided with splines 95 or some other suitable feature formed on interior surface 92 such as a groove, channel, notch, trench, ridge, hillock, rib, or any other recess or augmentation that cooperates with the exterior surface 102 of cylindrical inner sleeve 18 to keep steel cylindrical outer sleeve 16 from rotating independently of injection-molded plastic cylindrical inner sleeve 18. Elimination of independent rotational movement of cylindrical inner sleeve 18 and cylindrical outer sleeve 16 reduces both wear and failures.

The plastics material is injection-molded to form a bearing surface 26 on interior surface 92 of roller 10 as well as to form flanges or surfaces 20 on each end of cylindrical outer sleeve 16. These flanges 20 also axially trap the steel cylindrical outer sleeve 16 relative to cylindrical inner sleeve 18.

This configuration eliminates the unwanted tolerance stack-up between the inner diameter of the steel sleeve and the bearing outer diameter that exists in conventional rollers having bearings that are press-fit into the sleeve. This tolerance stack-up can cause scrap and failures as the result of problems caused by parts not fitting together properly. Too much press-fit can make it difficult to fit mounting pin or shaft 28 into the conventional roller, creating scrap. Too much press-fit can also result in insufficient clearance for shaft 28 hampering the free rotation of rollers and causing premature failures. Not enough press-fit can cause the bearings and the sleeves to rotate independently, also resulting in premature failures.

The injection-molded plastics material used in the present invention, however, fills any void that is present in interior region 94 between interior surface 92 and the member (not shown) of the mold (not shown). Inner diameter 104 of the roller 10 is established by the member of the mold rather than by assembled parts providing additional consistency to the roller inner diameter 104 and eliminating the tolerance stack-up that could otherwise occur when discrete parts are assembled. This improved consistency results in reduced wear and improved durability of each centrifugal actuator 11 in centrifugal clutch 14.

A second embodiment of a roller 210 in accordance with the present invention is shown in FIG. 9, a third embodiment of a roller 310 in accordance with the present invention is shown in FIG. 10, and a fourth embodiment of a roller 410 in accordance with the present invention is shown in FIG. 11.

Roller 210, shown in FIG. 9, includes flanges 218 on ends 96 of outer sleeve 16 engaging ends 114 of inner sleeve 18 to prevent axial movement of inner sleeve 18 relative to outer sleeve 16. In addition, flanges 218 extend radially outwardly to form annular drive arm-guiding ridges 220 on ends 96 of outer sleeve 16 defining drive arm-engaging surface 90 therebetween.

Drive arm-guiding ridges 220 engage centrifugal drive arms 24 to guide centrifugal drive arms 24, restraining lateral movement of centrifugal drive arms 24 relative to rollers 10 so that camming surfaces 21 of centrifugal drive arms 24 remain in engagement with drive arm-engaging surfaces 90. The lateral movement of centrifugal drive arms 24 is the result of inertia of the centrifugal drive arms 24 and occurs during rotation of movable pulley flange 38 about axis 48 of engine drive shaft 32. The significance of the lateral movement is greater for centrifugal drive arms 24 of greater mass and drive arm-guiding ridges 220 are particularly useful in cooperation with companion centrifugal drive arms 24 having sufficient mass to create appreciable lateral movement of tips 22 of centrifugal drive arms 24 relative to rollers 10.

Roller 310, shown in FIG. 10, includes flanges 318 on ends 114 of inner sleeve 18 engaging ends 96 of outer sleeve 16 to prevent axial movement of inner sleeve 18 relative to outer sleeve 16. In addition, roller 310 includes radially outwardly extending annular drive arm-guiding ridges 320 on ends 96 of outer sleeve 16, the ridges 320 defining drive arm-engaging surface 90 therebetween. Similarly to drive arm-guiding ridges 220 of roller 210, drive arm-guiding ridges 320 of roller 310 engage centrifugal drive arms 24 to guide centrifugal drive arms 24, restraining lateral movement of centrifugal drive arms 24 relative to rollers 10 so that camming surfaces 21 of centrifugal drive arms 24 remain in engagement with drive arm-engaging surfaces 90.

Roller 410 is formed with no flanges appended to the ends 96 of the cylindrical outer sleeve 16 or the ends 114 of the cylindrical inner sleeve 18, as shown in FIG. 11. Although centrifugal actuator 11 using roller 410 will require separate thrust washers (not shown) against the ends 96, 114 of roller 410, an advantage of roller 410 over roller 10 is that it is easier to injection mold roller 410 than it is to mold roller 10.

Assembling centrifugal actuators 11 including rollers 10, 210, 310, 410 in accordance with the present invention is less difficult than assembling centrifugal actuators including conventional rollers having a separate outer sleeve, bearings, and thrust washers. Eliminating bearings from the structure allows for the elimination of a step previously needed for pressing bearings into place. Use of rollers 10, 210 of the present invention also eliminates the need to mold additional thrust washers as well as eliminating the need during assembly of the roller to hold two thrust washers and a steel sleeve having press fit bearings while attempting to install the shaft 28 about which roller rotates. Use of the new rollers 10, 210 also eliminates the need to conduct a post-assembly check to ensure that conventional thrust washers are present and correctly placed.

Consumers, manufacturers, and users alike will appreciate the greater reliability and longer wear life brought about by the greater consistency achieved through use of the roller of the present invention. Additionally, manufacturers will appreciate the simple design and the ease of assembly of rollers 10, 210, 310, 410 brought about by the reduction of assembly parts caused by forming the rollers 10, 210, 310, 410 in one piece rather than using additional bearings and washers typically found with conventional rollers.

Although the invention has been described with reference to preferred embodiments, additional variations and modifications exist within the scope and spirit of the invention as described and defined in the following claims.

I claim:

1. A centrifugal actuator for a centrifugal clutch having an axially fixed base and an axially movable pulley flange, the actuator acting between the fixed base and the movable pulley flange, the actuator comprising a drive arm having a camming surface and a bottom that is pivotably attached to the movable pulley flange, a mounting pin coupled to the fixed base, and a roller including a cylindrical outer sleeve having a side wall formed to include an outer drive arm-engaging surface engaging the camming surface of the drive arm, the side wall of the outer sleeve defining an interior region, the roller including a cylindrical inner sleeve received by the interior region and including a side wall having an outer surface coupled to the cylindrical outer sleeve and an inner load-bearing surface engaging the mounting pin, the inner sleeve being made from a first material, and the outer sleeve being made from a second material having a higher hardness than the first material.

2. The centrifugal actuator of claim 1, further comprising a radially outwardly extending flange integrally appended to the cylindrical inner sleeve, the side wall of the cylindrical outer sleeve including an interior surface defining the interior region and a flange-engaging surface extending radially outwardly from the interior surface, the flange engaging the flange-engaging surface of the cylindrical outer sleeve.

3. The centrifugal actuator of claim 2, further comprising a radially outwardly extending second flange integrally appended to the cylindrical inner sleeve, the cylindrical outer sleeve including a second flange-engaging surface extending radially outwardly from the interior surface of the cylindrical outer sleeve, the second flange engaging the second flange-engaging surface, the first flange-engaging surface and the second flange-engaging surface being positioned to lie at opposing axial ends of the cylindrical outer sleeve.

4. The centrifugal actuator of claim 1, wherein the cylindrical outer sleeve rotates about an axis of rotation in response to movement of the camming surface of the drive arm as the drive arm pivots about a pivot axis and the roller further comprises trap means appended to the cylindrical inner sleeve for preventing axial movement of the cylindrical outer sleeve relative to the cylindrical inner sleeve.

5. The centrifugal actuator of claim 1, further comprising a radially inwardly extending flange integrally appended to the cylindrical outer sleeve, the cylindrical inner sleeve including a flange-engaging surface extending radially outwardly from the load-bearing surface, and the flange engaging the flange-engaging surface.

6. The centrifugal actuator of claim 5, further comprising a radially inwardly extending second flange integrally appended to the cylindrical outer sleeve, the cylindrical inner sleeve including a second flange-engaging surface extending radially outwardly from the load bearing surface, the second flange engaging the second flange-engaging surface.

7. The centrifugal actuator of claim 1, further comprising a radially outwardly extending annular ridge appended to the side wall of the cylindrical outer sleeve adjacent to the drive arm-engaging surface and arranged to engage the drive arm when the drive arm moves laterally relative to the roller to restrict lateral movement of the drive arm past the annular ridge.

8. The centrifugal actuator of claim 7, wherein the cylindrical outer sleeve is formed to further include a radially outwardly extending second annular ridge spaced apart from the first annular ridge and the drive arm-engaging surface is positioned to lie therebetween.

9. The centrifugal actuator of claim 1, further comprising guide means appended to the roller for restricting the sideways movement of the centrifugal drive arm in an axial direction relative to the roller so that the camming surface of the centrifugal drive arm remains in engagement with the drive arm-engaging surface of the roller.

10. The centrifugal actuator of claim 9, further comprising trap means appended to the cylindrical inner sleeve for preventing axial movement of the cylindrical outer sleeve relative to the cylindrical inner sleeve.

11. The centrifugal actuator of claim 1, wherein the cylindrical outer sleeve and cylindrical inner sleeve have a common axis of rotation, the cylindrical outer sleeve is arranged to rotate in response to movement of the camming surface of the drive arm as the drive arm pivots about a pivot axis, and the roller further comprises interlock means appended to the cylindrical outer sleeve for rotating the cylindrical inner sleeve about the axis of rotation in response to rotating movement of the cylindrical outer sleeve about the axis of rotation.

12. The centrifugal actuator of claim 11, further comprising trap means appended to the cylindrical inner sleeve for preventing axial movement of the cylindrical outer sleeve relative to the cylindrical inner sleeve.

13. The centrifugal actuator of claim 12, further comprising guide means appended to the roller for restricting the sideways movement of the centrifugal drive arm in an axial direction relative to the roller so that the camming surface of the centrifugal drive arm remains in engagement with the drive arm-engaging surface of the roller.

14. The centrifugal actuator of claim 1, wherein the drive arm-engaging surface is made from a material having a coefficient of friction such that the drive arm-engaging surface cooperates with the camming surface of the drive arm to rotate the roller in response to pivoting movement of the drive arm.

15. The centrifugal actuator of claim 14, wherein the cylindrical outer sleeve includes an interior surface adjacent to the interior region, the cylindrical inner sleeve includes an exterior surface engaging the interior surface of the cylindrical outer sleeve, and the cylindrical outer sleeve is made from a material that distributes the load resulting from the engagement of the drive arm with the drive arm-engaging surface across the full area of the exterior surface.

16. The centrifugal actuator of claim 15, wherein the first cylindrical sleeve is made from steel.

17. A centrifugal actuator for a centrifugal clutch having an axially fixed base and an axially movable pulley flange, the actuator acting between the fixed base and the movable pulley flange, the actuator comprising a drive arm having a camming surface and a bottom that is pivotably attached to the movable pulley flange, a mounting pin coupled to the fixed base, a roller including a cylindrical outer sleeve having a side wall formed to include an outer drive arm-engaging surface engaging the camming surface of the drive arm, the side wall of the outer sleeve defining an interior region, the roller including a cylindrical inner sleeve received by the interior region and including a side wall having an outer surface coupled to the cylindrical outer sleeve and an inner load-bearing surface engaging the mounting pin, a radially outwardly extending flange integrally appended to the cylindrical inner sleeve, the side wall of the cylindrical outer sleeve including an interior surface defining the interior region and a flange-engaging surface extending radially outwardly from the interior surface, the flange engaging the flange-engaging surface of the cylindrical outer sleeve, and a radially inwardly extending spline appended to the outer sleeve and extending into the interior region, the outer surface of the side wall of the cylindrical inner sleeve being formed to include a recess that receives the spline so that the cylindrical inner sleeve rotates in response to rotation of the cylindrical outer sleeve when the cylindrical outer sleeve rotates in response to the pivoting movement of the drive arm.

18. A centrifugal actuator for a centrifugal clutch having an axially fixed base and an axially movable pulley flange, the actuator acting between the fixed base and the movable pulley flange, the actuator comprising a drive arm having a camming surface and a bottom that is pivotably attached to the movable pulley flange, a mounting pin coupled to the fixed base, and a roller including a cylindrical outer sleeve having a side wall formed to include an outer drive arm-engaging surface engaging the camming surface of the drive arm, the side wall of the outer sleeve defining an interior region, the roller including a cylindrical inner sleeve received by the interior region and including a side wall having an outer surface coupled to the cylindrical outer sleeve and an inner load-bearing surface engaging the mounting pin, a radially inwardly extending flange integrally appended to the cylindrical outer sleeve, the cylindrical inner sleeve including a flange-engaging surface extending radially outwardly from the load-bearing surface, the flange engaging the flange-engaging surface, and a radially inwardly extending spline appended to the outer sleeve and extending into the interior region, the outer surface of the side wall of the cylindrical inner sleeve being formed to include a recess that receives the spline so that the cylindrical inner sleeve rotates in response to rotation of the cylindrical outer sleeve when the cylindrical outer sleeve rotates in response to the pivoting movement of the drive arm.

19. A centrifugal actuator for a centrifugal clutch having an axially fixed base and an axially movable pulley flange, the actuator acting between the fixed base and the movable pulley flange, the actuator comprising a drive arm having a camming surface and a bottom that is pivotably attached to the movable pulley flange, a mounting pin coupled to the fixed base, and a roller including a cylindrical outer sleeve having a side wall formed to include an outer drive arm-engaging surface engaging the camming surface of the drive arm, the side wall of the outer sleeve defining an interior region, the roller including a cylindrical inner sleeve received by the interior region and including a side wall having an outer surface coupled to the cylindrical outer sleeve and an inner load-bearing surface engaging the mounting pin, a radially outwardly extending annular ridge appended to the side wall of the cylindrical outer sleeve adjacent to the drive arm-engaging surface and arranged to engage the drive arm when the drive arm moves laterally relative to the roller to restrict lateral movement of the drive arm past the annular ridge, and an annular flange, the cylindrical inner sleeve being formed to include an end and the annular flange engaging the end of the cylindrical inner sleeve, the annular flange being appended to the annular ridge.

20. The centrifugal actuator of claim 19, wherein a radially inwardly extending spline is appended to the outer sleeve and extends into the interior region and the outer surface of the side wall of the cylindrical inner sleeve is formed to include a recess that receives the spline so that the cylindrical inner sleeve rotates in response to rotation of the cylindrical outer sleeve when the cylindrical outer sleeve rotates in response to the pivoting movement of the drive arm.

21. A centrifugal actuator for a centrifugal clutch having an axially fixed base and an axially movable pulley flange, the actuator acting between the fixed base and the movable pulley flange, the actuator comprising a drive arm having a camming surface and a bottom that is pivotably attached to the movable pulley flange, a mounting pin coupled to the fixed base, a roller including a cylindrical outer sleeve having a side wall formed to include an outer drive arm-engaging surface engaging the camming surface of the drive arm, the side wall of the outer sleeve defining an interior region, the roller including a cylindrical inner sleeve received by the interior region and including a side wall having an outer surface coupled to the cylindrical outer sleeve and an inner load-bearing surface engaging the mounting pin, and a radially inwardly extending spline appended to the outer sleeve and extending into the interior region, the outer surface of the side wall of the cylindrical inner sleeve being formed to include a recess that receives the spline so that the cylindrical inner sleeve rotates in response to rotation of the cylindrical outer sleeve to minimize wear of the roller and the drive arm when the cylindrical outer sleeve rotates in response to the pivoting movement of the drive arm.

22. The centrifugal actuator of claim 21, wherein the recess is an axially-extending elongated groove and the spline is elongated and extends axially.

23. The centrifugal actuator of claim 22, wherein the cylindrical inner sleeve further includes a first end and a second end, the groove extends from the first end of the cylindrical inner sleeve to the second end of the cylindrical inner sleeve, and the spline extends from the first end of the cylindrical inner sleeve to the second end of the cylindrical inner sleeve.

24. A centrifugal actuator for a centrifugal clutch having an axially fixed base and an axially movable pulley flange, the actuator acting between the fixed base and the movable pulley flange, the actuator comprising a drive arm having a camming surface and a bottom that is pivotably attached to the movable pulley flange, a mounting pin coupled to the fixed base, a roller including a cylindrical outer sleeve having a side wall formed to include an outer drive arm-engaging surface engaging the camming surface of the drive arm, the side wall of the outer sleeve defining an interior region, the roller including a cylindrical inner sleeve received by the interior region and including a side wall having an outer surface coupled to the cylindrical outer sleeve and an inner load-bearing surface engaging the mounting pin, and a radially outwardly extending spline appended to the cylindrical inner sleeve, the side wall of the cylindrical outer sleeve including an inner surface and the inner surface of the side wall of the cylindrical outer sleeve being formed to include a recess that receives the spline so that the cylindrical inner sleeve rotates in response to rotation of the cylindrical outer sleeve to minimize wear of the roller and the drive arm when the cylindrical outer sleeve rotates in response to the pivoting movement of the drive arm.

25. A centrifugal actuator of a centrifugal clutch including a base that is fixed to an engine drive shaft and a movable pulley flange that is axially movable relative to the engine drive shaft, the centrifugal actuator acting between the base and the movable pulley flange, the centrifugal actuator comprising a drive arm pivotably coupled to the movable pulley flange for pivoting movement about a pivot axis, a mounting pin coupled to the base, and a roller mounted on the pin and engaging the drive arm, the roller including a cylindrical inner sleeve having a side wall having an outer surface, the cylindrical inner sleeve being arranged to rotate about an axis of rotation, a cylindrical outer sleeve including a side wall having an inner surface coupled to the outer surface of the cylindrical inner sleeve, and a spline appended to the outer surface of the cylindrical inner sleeve and engaging the cylindrical outer sleeve, the spline cooperating with the cylindrical outer sleeve to interlock the cylindrical inner sleeve and the cylindrical outer sleeve so that wear of both the roller and the drive arm is minimized.

26. The centrifugal actuator of claim 25, wherein the spline extends in an axial direction along the outer surface of the cylindrical inner sleeve.

27. The centrifugal actuator of claim 26, wherein the roller includes a first end and a second end and the spline extends from the first end of the roller to the second end of the roller.

28. The centrifugal actuator of claim 25, further comprising a second spline and a third spline, each of the second and third splines being appended to the outer surface of the cylindrical inner sleeve and extending radially outwardly therefrom, the second and third splines cooperating with the cylindrical outer sleeve to rotatably interlock the cylindrical inner sleeve and the cylindrical outer sleeve, the first, second, and third splines being radially spaced apart on the outer surface of the cylindrical inner sleeve.

29. A centrifugal actuator of a centrifugal clutch including a base that is fixed to an engine drive shaft and a movable pulley flange that is axially movable relative to the engine drive shaft, the centrifugal actuator acting between the base and the movable pulley flange, the centrifugal actuator comprising a drive arm pivotably coupled to the movable pulley flange for pivoting movement about a pivot axis, a mounting pin coupled to the base, and a roller mounted on the pin and engaging the drive arm, the roller including a cylindrical inner sleeve having a side wall, a cylindrical outer sleeve coupled to the side wall of the cylindrical inner sleeve, the cylindrical outer sleeve having a side wall formed to include a first flange-engaging surface and a second flange-engaging surface, the cylindrical inner sleeve being made from a plastics material, and the cylindrical outer sleeve being made from a metal material, a first flange appended to the cylindrical inner sleeve and engaging the first flange-engaging surface, and a second flange appended to the cylindrical inner sleeve and engaging the second flange-engaging surface so that the cylindrical outer sleeve is axially fixed relative to the cylindrical inner sleeve, the first and second flanges being made from the plastics material.

30. The centrifugal actuator of claim 29, wherein the outer sleeve has an axial first end and an axial second end, the first flange-engaging surface defines the first end, and the second flange-engaging surface defines the second end.

31. The centrifugal actuator of claim 29, further comprising a radially outwardly extending annular ridge appended to the side wall of the cylindrical outer sleeve and engaging the drive arm when the drive arm moves laterally relative to the roller to restrict lateral movement of the drive arm past the annular ridge.

32. The centrifugal actuator of claim 31, wherein the cylindrical outer sleeve is formed to further include a radially outwardly extending second annular ridge spaced apart from the first annular ridge, the first annular ridge being positioned to lie adjacent to the first flange-engaging surface and the second annular ridge being positioned to lie adjacent to the second flange-engaging surface.

33. A centrifugal actuator of a centrifugal clutch including a base that is fixed to an engine drive shaft and a movable pulley flange that is axially movable relative to the engine drive shaft, the centrifugal actuator acting between the base and the movable pulley flange, the centrifugal actuator comprising a drive arm pivotably coupled to the movable pulley flange for pivoting movement about a pivot axis, a mounting pin coupled to the base, a roller mounted on the pin and engaging the drive arm, the roller including a cylindrical inner sleeve having a side wall, a cylindrical outer sleeve coupled to the side wall of the cylindrical inner sleeve, the cylindrical outer sleeve having a side wall formed to include a first flange-engaging surface and a second flange-engaging surface, the outer sleeve having an axial first end and an axial second end, the first flange-engaging surface defining the first end, and the second flange-engaging surface defining the second end, a first flange appended to the cylindrical inner sleeve and engaging the first flange-engaging surface, a second flange appended to the cylindrical inner sleeve and engaging the second flange-engaging surface so that the cylindrical outer sleeve is axially fixed relative to the cylindrical inner sleeve, thereby minimizing wear of the roller and the drive arm, and a radially outwardly extending spline having a first axial end and a second axial end, the side wall of the cylindrical inner sleeve including an outer surface coupled to the side wall of the cylindrical outer sleeve, the spline being appended to the outer surface of the cylindrical inner sleeve, the first axial end of the spline engaging the first flange and the second axial end of the spline engaging the second flange.

34. A centrifugal actuator for a centrifugal clutch of the type having a variable-speed pulley including a fixed pulley flange configured to define one side of a belt-receiving V-shaped groove and mounted on a rotatable drive shaft, a movable pulley flange configured to define another side of the belt-receiving V-shaped groove and mounted to slide axially on the rotatable drive shaft to vary the width of the V-shaped groove, and a fixed base mounted on the rotatable drive shaft, the centrifugal actuator comprising a centrifugal drive arm having a bottom end and an opposite tip end having a camming surface, the bottom end being pivotably mounted to the movable pulley flange, a cylindrical mounting pin having a central axis, the mounting pin being mounted to the fixed base, and a roller including a cylindrical inner sleeve arranged to rotate about the central axis of the mounting pin, the cylindrical inner sleeve including a side wall having a first end, a second end, a radially exterior surface, and a radially interior bearing surface defining an interior region, the cylindrical inner sleeve receiving the pin so that the bearing surface engages the pin, a cylindrical outer sleeve appended to the cylindrical inner sleeve, the cylindrical outer sleeve including a first end, a second end, and a side wall having an exterior drive arm-engaging surface and a radially interior surface defining an interior region, the cylindrical inner sleeve being received in the interior region of the cylindrical outer sleeve so that the interior surface of the cylindrical outer sleeve is coupled to the exterior surface of the cylindrical inner sleeve, a plurality of radially outwardly extending splines integrally appended to the exterior surface of the cylindrical inner sleeve, the interior surface of the cylindrical outer sleeve being formed to include recesses receiving the splines, a first flange appended to the first end of the cylindrical inner sleeve and engaging the first end of the cylindrical outer sleeve, and a second flange appended to the second end of the cylindrical inner sleeve and engaging the second end of the cylindrical outer sleeve.

35. A centrifugal clutch comprising an elongated hub, a movable pulley flange including means for slidably mounting the movable pulley flange to the hub, a drive spider fixed to the hub, a spring arranged to urge the movable pulley flange axially toward the drive spider, a drive arm including a camming surface and a bottom, a pin mounted on the drive spider, and a roller rotatably mounted on the pin and arranged to engage the camming surface of the drive arm to slide the movable pulley flange along the hub away from the drive spider as the drive arm pivots in response to rotation of the hub, the roller including a cylindrical outer sleeve having a side wall having an interior region and an exterior drive arm-engaging surface, a cylindrical inner sleeve having a side wall having an exterior surface coupled to the interior surface of the cylindrical outer sleeve and an interior bearing surface engaging the pin, the cylindrical inner sleeve being made from a first material, and the cylindrical outer sleeve being made from a second material having a higher hardness than the first material.

36. The centrifugal clutch of claim 35, further comprising a first flange appended to a first end of the cylindrical inner sleeve and engaging a first end of the cylindrical outer sleeve, and a second flange appended to a second end of the cylindrical inner sleeve and engaging a second end of the cylindrical outer sleeve.

37. A centrifugal clutch comprising an elongated hub, a movable pulley flange including means for slidably mounting the movable pulley flange to the hub, a drive spider fixed to the hub, a spring arranged to urge the movable pulley flange axially toward the drive spider, a drive arm including a camming surface and a bottom, a pin mounted on the drive spider, and a roller rotatably mounted on the pin and arranged to engage the camming surface of the drive arm to slide the movable pulley flange along the hub away from the drive spider as the drive arm pivots in response to rotation of the hub, the roller including a cylindrical outer sleeve having a side wall having an interior region and an exterior drive arm-engaging surface, and the roller including a cylindrical inner sleeve having a side wall having an exterior surface coupled to the interior surface of the cylindrical outer sleeve and an interior bearing surface engaging the pin, the inner sleeve being formed to include a plurality of radially outwardly extending splines and the outer sleeve being formed to include a plurality of recesses adjacent to the splines, the splines and the outer sleeve adjacent to the recesses cooperating to radially interlock the inner sleeve and the outer sleeve so that the inner sleeve rotates in response to rotation of the outer sleeve to minimize wear of the roller and the drive arm.

38. A centrifugal actuator for a centrifugal clutch having an axially fixed base and an axially movable pulley flange, the actuator acting between the fixed base and the movable pulley flange, the actuator comprising a drive arm having a camming surface and a bottom that is pivotably attached to the movable pulley flange, a mounting pin coupled to the fixed base, and a roller including a cylindrical outer sleeve having a side wall formed to include an outer drive arm-engaging surface engaging the camming surface of the drive arm, the side wall of the outer sleeve having an inner surface defining an interior region, the roller including a cylindrical inner sleeve received by the interior region and including a side wall having an outer surface coupled to the cylindrical outer sleeve, the inner sleeve having an inner load-bearing surface engaging the mounting pin, the inner sleeve being constrained from rotationally moving relative to the outer sleeve, and the inner sleeve being constrained from axially moving relative to the outer sleeve.

39. The centrifugal actuator of claim 38, wherein one of the inner and outer sleeves is formed to include a spline, the other of the inner and outer sleeves is formed to include a slot that receives the spline, and the spline and slot cooperate to constrain radial movement of the inner sleeve relative to the outer sleeve.

40. The centrifugal actuator of claim 38, wherein one of the inner and outer sleeves is formed to include a flange, the other of the inner and outer sleeves includes a flange-engaging surface that abuts the flange, and the flange and flange-engaging surface cooperate to constrain axial movement of the inner sleeve relative to the outer sleeve.

41. The centrifugal actuator of claim 38, wherein one of the inner and outer sleeves is formed to include a radially outwardly extending annular ridge and the ridge is arranged to engage the drive arm when the drive arm moves laterally relative to the roller to constrain lateral movement of the drive arm.

42. The centrifugal actuator of claim 38, wherein the inner sleeve is made from a plastics material and the outer sleeve is made from a metal material.

43. The centrifugal actuator of claim 42, wherein the inner sleeve is constrained from moving axially relative to the outer sleeve.

44. The centrifugal actuator of claim 43, wherein the inner sleeve is constrained from moving radially relative to the outer sleeve.

45. The centrifugal actuator of claim 42, wherein the inner sleeve is constrained from moving radially relative to the outer sleeve.

46. A centrifugal actuator for a centrifugal clutch having an axially fixed base and an axially movable pulley flange, the actuator acting between the fixed base and the movable pulley flange, the actuator comprising a drive arm having a camming surface and a bottom that is pivotably attached to the movable pulley flange, a mounting pin coupled to the fixed base, and a roller including a cylindrical outer sleeve having a side wall formed to include an outer drive arm-engaging surface engaging the camming surface of the drive arm, the side wall of the outer sleeve having an inner surface defining an interior region, the roller including a cylindrical inner sleeve received by the interior region and including a side wall having an outer surface that couples to the cylindrical outer sleeve, the inner sleeve having an inner load-bearing surface engaging the mounting pin, and the outer sleeve having higher wear resistance properties than the inner sleeve.

* * * * *